(12) United States Patent
Minato et al.

(10) Patent No.: US 9,582,733 B2
(45) Date of Patent: Feb. 28, 2017

(54) IMAGE PROCESSING DEVICE, IMAGE PROCESSING METHOD, AND IMAGE PROCESSING PROGRAM

(71) Applicant: OMRON CORPORATION, Kyoto (JP)

(72) Inventors: Yoshihisa Minato, Kyoto (JP); Yuki Akatsuka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 6 days.

(21) Appl. No.: 14/561,728

(22) Filed: Dec. 5, 2014

(65) Prior Publication Data
US 2015/0227811 A1    Aug. 13, 2015

(30) Foreign Application Priority Data

Dec. 12, 2013  (JP) ................................. 2013-256904

(51) Int. Cl.
G06K 9/46    (2006.01)
G06T 11/20   (2006.01)
(Continued)

(52) U.S. Cl.
CPC .............. G06K 9/52 (2013.01); G06K 9/342 (2013.01); G06K 9/4638 (2013.01); G06T 5/002 (2013.01); G06T 7/0004 (2013.01)

(58) Field of Classification Search
CPC ........ G06K 9/52; G06K 9/4638; G06K 9/342; G06K 9/48; G06K 9/6204; G06K 9/4604;
(Continued)

(56) References Cited

U.S. PATENT DOCUMENTS 7,853,052 B2 * 12/2010 Yanagawa .......... G06K 9/00288
                                                           382/118
8,086,023 B2 * 12/2011 Shimodaira .......... G06K 9/6204
                                                           382/149
(Continued)

FOREIGN PATENT DOCUMENTS

JP    2007-249555    9/2007
JP    2009-186338    8/2009

OTHER PUBLICATIONS

Toldo, Roberto et al., "Robust Multiple Structures Estimation with J-Linkage", Computer Vision, Oct. 2008, 11 pages.*
(Continued)

*Primary Examiner* — Sheela C Chawan
(74) *Attorney, Agent, or Firm* — Greenblum & Bernstein, P.L.C.

(57) ABSTRACT

The invention provides an image processing device, an image processing method, and an image processing program capable of maintaining estimation accuracy even when an input image of a processing target includes a plurality of shape elements. The image processing device includes: a recognizing unit that recognizes one or more shape elements which are included in the input image from a feature amount included in the input image; a selecting unit that selects a desired shape element out of the recognized one or more shape elements; and an estimating unit that estimates a target shape element from information of a region corresponding to the selected shape element.

12 Claims, 8 Drawing Sheets

(51) Int. Cl.
*G06K 9/52* (2006.01)
*G06K 9/34* (2006.01)
*G06T 5/00* (2006.01)
*G06T 7/00* (2006.01)

(58) Field of Classification Search
CPC ..... G06T 5/002; G06T 7/0004; G06T 7/0083; H04N 7/26643
USPC ....... 382/100, 155, 162, 168, 173, 181, 232, 382/254, 276, 309, 312, 325, 203, 103, 382/104, 131, 190, 209; 345/689, 441, 345/156; 702/167, 127, 85, 108, 150
See application file for complete search history.

(56) References Cited

U.S. PATENT DOCUMENTS

| | | | |
|---|---|---|---|
| 9,189,694 B2* | 11/2015 | Tonogai | ............... G06K 9/723 |
| 2009/0202135 A1 | 8/2009 | Shimodaira | |
| 2011/0279475 A1* | 11/2011 | Ikenoue | ................ G06T 7/208 345/619 |
| 2015/0262022 A1* | 9/2015 | Fujikawa | ................ G06K 9/18 382/141 |

OTHER PUBLICATIONS

Extended European Search Report in EP 14196055.9, dated Apr. 30, 2015.
Grimson, Willliam Eric, "Object Recognition by Computer: The Role of Geometric Constraints", 1990, Massachusetts Institute of Technology, pp. 8-17, 42-43, 76-79, 98-101.
McLean, G.F. et al., "Hierarchical Clustering for Automated Line Detection", IEEE Pac Rim 1993, pp. 244-247.
U.S. Appl. No. 14/625,894 to Yoshihisa Minato et al., filed Feb. 19, 2015.
U.S. Appl. No. 14/602,565 to Yoshihisa Minato et al., filed Jan. 22, 2015.
U.S. Appl. No. 14/601,524 to Yoshihisa Minato et al., filed Jan. 21, 2015.

* cited by examiner

IMAGE PROCESSING DEVICE, IMAGE PROCESSING METHOD, AND IMAGE PROCESSING PROGRAM

CROSS-REFERENCE TO RELATED APPLICATION

This application is based on Japanese Patent Application No. 2013-256904 filed with the Japan Patent Office on Dec. 12, 2013, the entire contents of which are incorporated herein by reference.

FIELD

The present invention relates to an image processing device, an image processing method, and an image processing program for estimating a shape element that is included in an input image.

BACKGROUND

Conventionally, in the FA (Factory Automation) field and the like, there have been put into practical application, various kinds of image processing devices that perform the processing of a presence test of a defect and stain on the work as a measurement object, measurement of a size and a shape of the work, and recognition of a character and a shape on the work. As an example of the image processing in the FA field, there has been known the processing of estimating a shape element of a mark and the like that have been printed to the work in advance, and performing positioning based on the estimate result.

In this image processing, mixing of noise into the image due to various kinds of disturbance cannot be avoided. As methods for enhancing measurement precision by removing such noise, there have been known techniques disclosed in Unexamined Japanese Patent Publication No. 2007-249555 and Unexamined Japanese Patent Publication No. 2009-186338.

Unexamined Japanese Patent Publication No. 2007-249555 discloses a technique of realizing a high-accurate approximation straight line by efficiently excluding an outlier from coordinates included in the coordinate group. Unexamined Japanese Patent Publication No. 2009-186338 discloses a technique capable of correctly detecting a defect such as flash and chip based on a difference of each edge point from a proper base line that has been set to each of a plurality of edge points, even when an object has a complex shape. That is, these prior art documents disclose a method for determining a straight line element that shows an outer shape of a measurement object from the edge position.

SUMMARY

By using the methods described in the above prior art documents, one side of a rectangular measurement object and the like can be estimated. However, in actual processing, a plurality of straight line elements are sometimes mixed into the measurement target region. In such a case, even when the techniques described in the above prior art documents are used, measurement precision may become low.

Therefore, there have been desired an image processing device, an image processing method, and an image processing program capable of maintaining estimation accuracy even when the input image of a processing target includes a plurality of shape elements.

An image processing device according to the present invention includes a recognizing unit that recognizes one or more shape elements which are included in an input image from a feature amount included in the input image, a selecting unit that selects a desired shape element out of the recognized one or more shape elements, and an estimating unit that estimates a target shape element from information of a region corresponding to the selected shape element.

According to the present invention, estimation accuracy can be maintained even when the input image of a processing target includes a plurality of shape elements.

DETAILED DESCRIPTION

Figure 1:
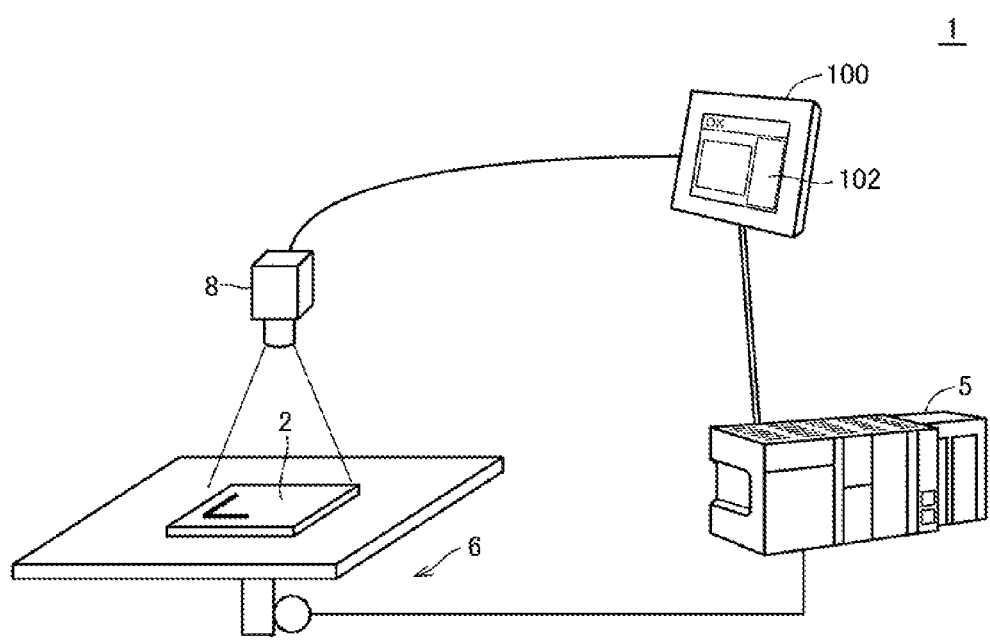
FIG. 1 is a schematic view of a total configuration of an image processing system that includes an image processing device according to the embodiment.

An embodiment according to the present invention will be described in detail with reference to the drawings. In the drawings, identical or corresponding portions will be attached with the same signs, and description of these portions will not be repeated.

<A. Configuration of Image Processing System>

FIG. 1 is a schematic view of a total configuration of an image processing system 1 that includes the image processing device 100 according to the embodiment. An image of a measurement object 2 (hereinafter also referred to as "work 2") that is attached with a mark on the surface is captured, and the work 2 is positioned based on the result of image processing the image obtained by the image capturing.

In FIG. 1, the image processing system 1 includes the image processing device 100 which is also referred to as a visual sensor, an image capturing unit 8, a PLC (Programmable Logic Controller) 5 that can communicate with the image processing device 100, and a movable stage 6. FIG. 1 shows the image processing device 100 that is integrally configured with a display unit 102, as an example.

In the following description, an image generated by capturing the image by the image capturing unit 8 will be also referred to as "input image". That is, the image processing device 100 estimates a shape element included in the input image. However, the input image that can be processed by the image processing device 100 is not limited to the image generated by capturing the image by the image capturing unit 8, and may be an image obtained in advance by a certain image capturing device and the like.

The image processing device 100 outputs positional information of a specified the work 2 to the PLC 5. The PLC 5 outputs a command to the movable stage 6, based on the positional information of the work 2 from the image processing device 100. In this way, the image processing device 100 may have a unit that outputs an instruction to a driving device that changes a position of the work 2 as a subject, based on an estimated parameter which indicates a target shape element.

The image capturing unit 8 is a unit that generates an input image by capturing the image of the subject. As an example, the image capturing unit 8 is configured to include image capturing elements partitioned by a plurality of pixels, such as a CCD (Coupled Charged Device) and a CMOS (Complementary Metal Oxide Semiconductor) sensor, in addition to an optical system such as a lens. The input image that has been generated by capturing the image by the image capturing unit 8 is transmitted to the image processing device 100. There may be further provided an illumination device that illuminates light to the work 2 of which an image is to be captured by the image capturing unit 8. Further, the image processing device 100 may be configured to be able to be connected with a plurality of image capturing units 8.

<B. Configuration of Image Processing Device>

Figure 2:
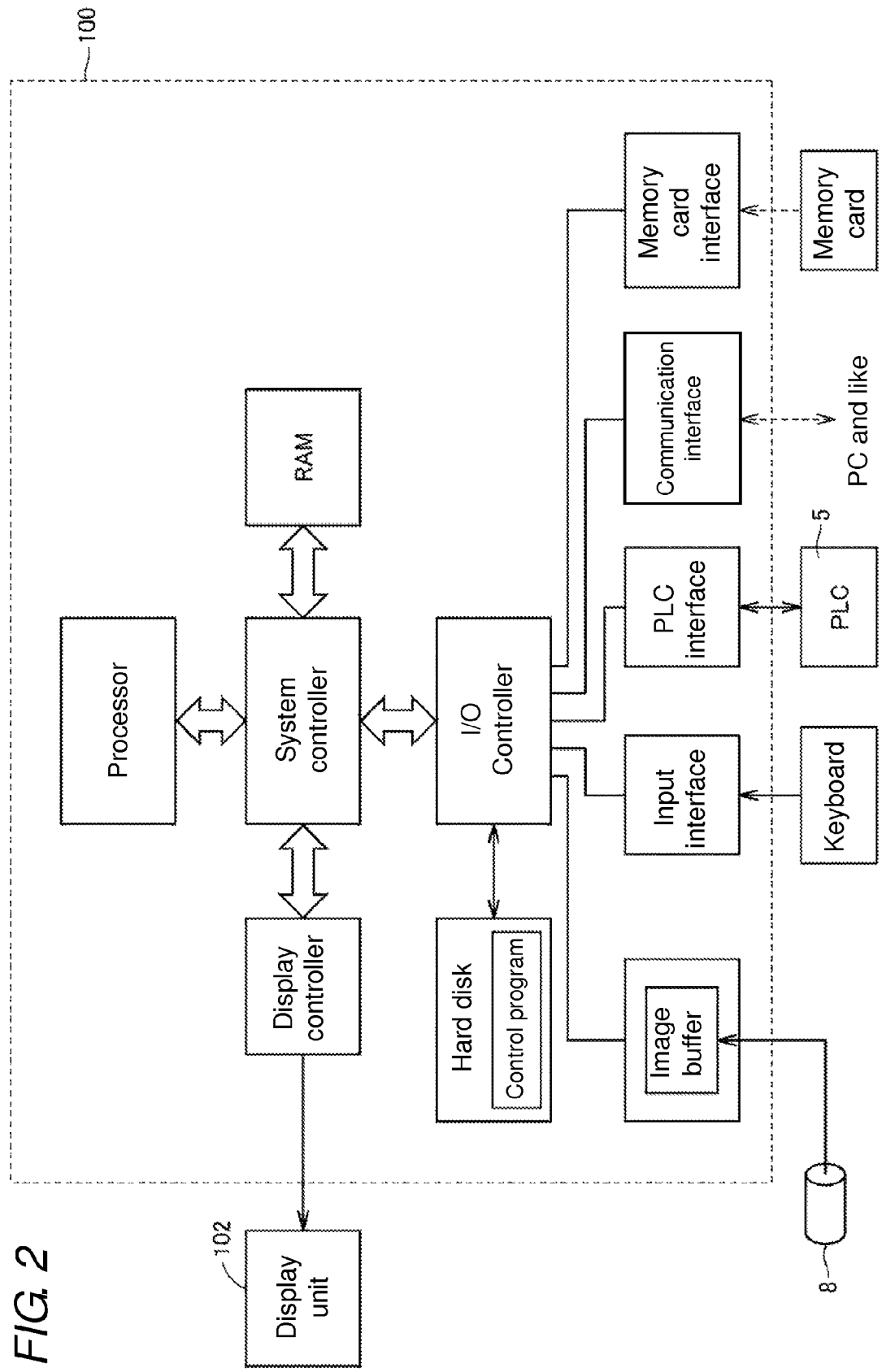
FIG. 2 is a schematic view of a functional configuration of the image processing device according to the embodiment.

FIG. 2 is a schematic view of a functional configuration of the image processing device 100 according to the embodiment.

In FIG. 2, the image processing device 100 has representatively a structure following a general-purpose computer architecture. The processor executes a program installed in advance, and realizes the image processing described later.

<C. Problems and Background Techniques>

As an assumption for describing the processing and functions of the image processing device, the image processing method, and the image processing program according to the embodiment, problems and the background techniques to be coped with by the present image processing will be described.

Figure 3:
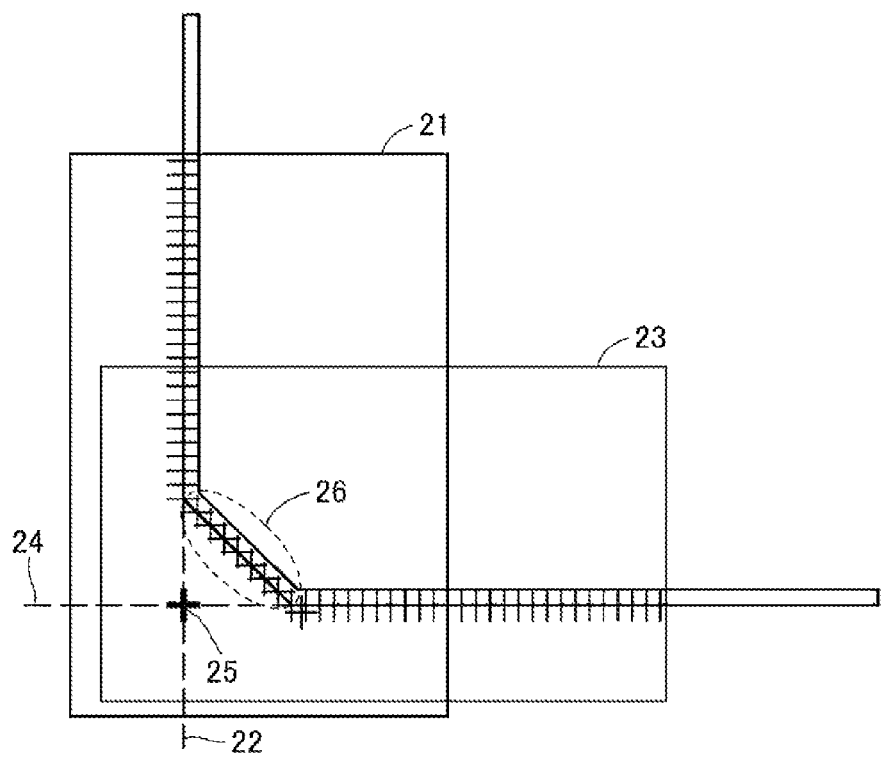
FIG. 3 shows an example of an image processing result.

FIG. 3 shows an example of an image processing result. The image processing result shown in FIG. 3 shows a positioning mark added to the work in advance. The positioning mark includes straight line elements that are respectively parallel to the paper vertical direction and the paper lateral direction, and other straight line element that connects between these straight line elements. That is, the input image generated by capturing the image of the work by the image capturing unit 8 includes mainly three straight line elements.

As a representative application, there is determined an intersection point 25 of approximation straight lines 22 and 24 of two straight line elements that are respectively parallel to the paper vertical direction and the paper lateral direction of this positioning mark, and positioning control is performed by using the coordinate values of the intersection point 25. As a detailed processing procedure, for the input image, an edge search region 21 as a measurement target region is set to determine the approximation straight line 22, and also an edge search region 23 is set to determine the approximation straight line 24. The setting positions and sizes of the edge search regions 21 and 23 are registered in advance. The edge points are extracted in each region of the edge search regions 21 and 23. The approximation straight lines that express the straight line elements are determined from the edge point group extracted in each region of the edge search regions 21 and 23. The "+" mark in FIG. 3 expresses an intersection point 25 of the approximation straight lines based on the extracted edge point.

In the image processing shown in FIG. 3, it is clear that the edge search regions 21 and 23 include a straight line element 26 that is not the estimation target, in addition to the straight line elements to be originally estimated. That is, the edge point extracted for the straight line element 26 is unavoidably used in determining approximation straight lines 22 and 24. When the shape element other than the estimation target is mixed in this way in the measurement target region in addition to the shape elements to be originally estimated, estimation accuracy may become low. That is, when a plurality of shape elements have been mixed in the measurement target region, accuracy easily becomes low. Due to the presence of a plurality of shape elements in a single edge search region in this way, positional deviation cannot be corrected in some cases because of inability of correctly determining approximation straight lines and the intersection point.

Figure 4:
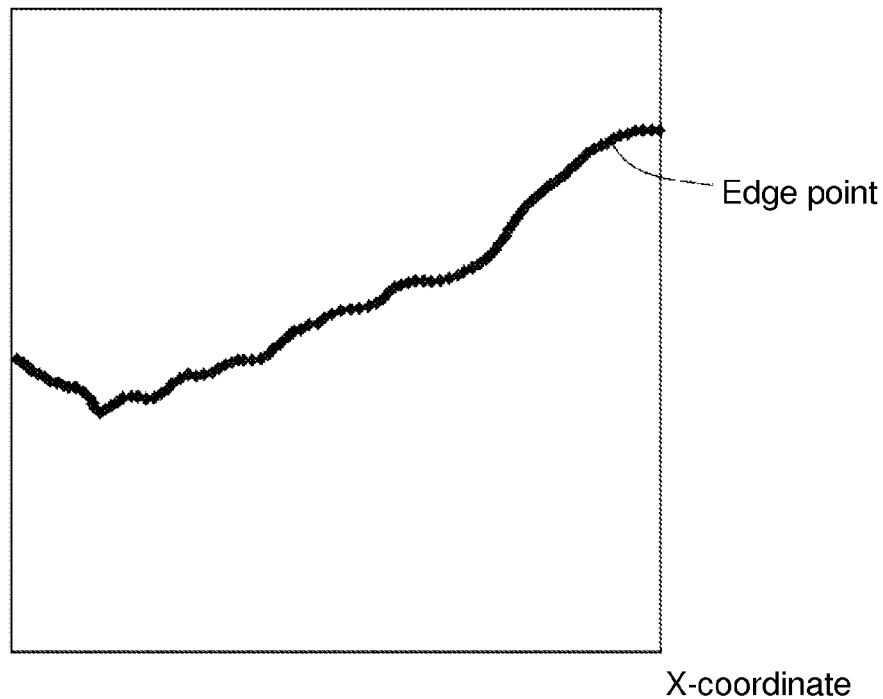
FIG. 4 shows an example of edge points extracted from the input image.
Figure 5:
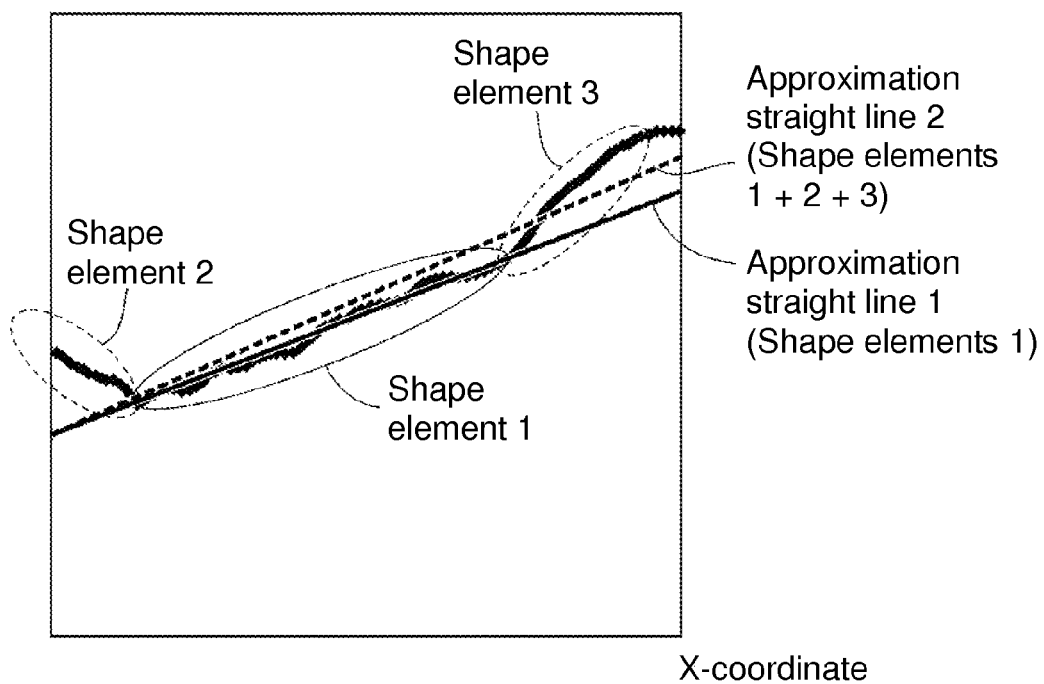
FIG. 5 shows an example of a straight line element determined from the edge points shown in FIG. 4.

FIG. 4 shows an example of edge points extracted from the input image. FIG. 5 shows an example of a straight line element that is determined from the edge points shown in FIG. 4.

FIG. 4 shows an extraction result of edge points of the input image that includes mainly three shape elements. That is, as shown in FIG. 5, the input image includes shape elements 1, 2, and 3. For example, consider the case where shape element 1 is the estimation target out of these shape elements. In this case, it is necessary to determine an approximation straight line 1 shown in FIG. 5. However, when all edge points that have been extracted from shape elements 1, 2, and 3 are used, an approximation straight line 2 is determined. Therefore, it is necessary to determine the approximation straight line by limiting to the shape element of the estimation target, out of the extraction result of edge points as shown in FIG. 4 and FIG. 5. That is, when the components of a plurality of shape elements cannot be separated, there is no way but to take average straight line approximation based on all extracted edge points. This has a problem in that a straight line which is entirely different from the originally intended estimate of a straight line is output. Therefore, as shown in FIG. 5, it is desired to estimate in high accuracy a target shape element from only the target shape element obtained by separating this target shape element out of the plurality of shape elements.

As background techniques for estimating a specific shape element from the result of a plurality of shape elements, there have been known (1) classical method, (2) random sampling method, and (3) noise removal method.

(1) As a classical method, a least-squares method, a total least-squares method, and a main-component analysis have been known. These methods do not have a function of removing an abnormal point, and have a problem in that estimation accuracy becomes low by a separate edge detected by error and the like.

(2) As a random sampling method, the RANSAC (Random Sampling Consensus) has been known. Because this is a statistical method, the RANSAC has a problem in that estimation becomes unstable when the number of input points is small, and a problem in that estimation accuracy becomes low when a deviated point is present due to mixing of an abnormal point or other shape element.

(3) As a noise removal method, there have been known the the robust least-squares method (M estimation and the like), the distance-based value voting method, the local representative edge method, and the parameter-space voting method (Hough transformation and the like). As an example of a distance-based value voting method, there is a method disclosed in Unexamined Japanese Patent Publication No. 2007-249555. As an example of a local representative edge method, there is a method disclosed in Unexamined Japanese Patent Publication No. 2009-186338. These noise removal methods are based on the assumption that basically one shape element is included as a main component. Therefore, an abnormal point included in a single shape element can be removed by finding the abnormal point relatively easily. However, there is a problem in that it is difficult to correctly find an abnormal point when a plurality of shape elements are included or when the point is gradually deviated.

<D. Summary>

In order to cope with the problems that cannot be solved by the above background techniques, the image processing method according to the embodiment basically uses the combination of "data purification processing" and "shape-fitting processing".

Figure 6:
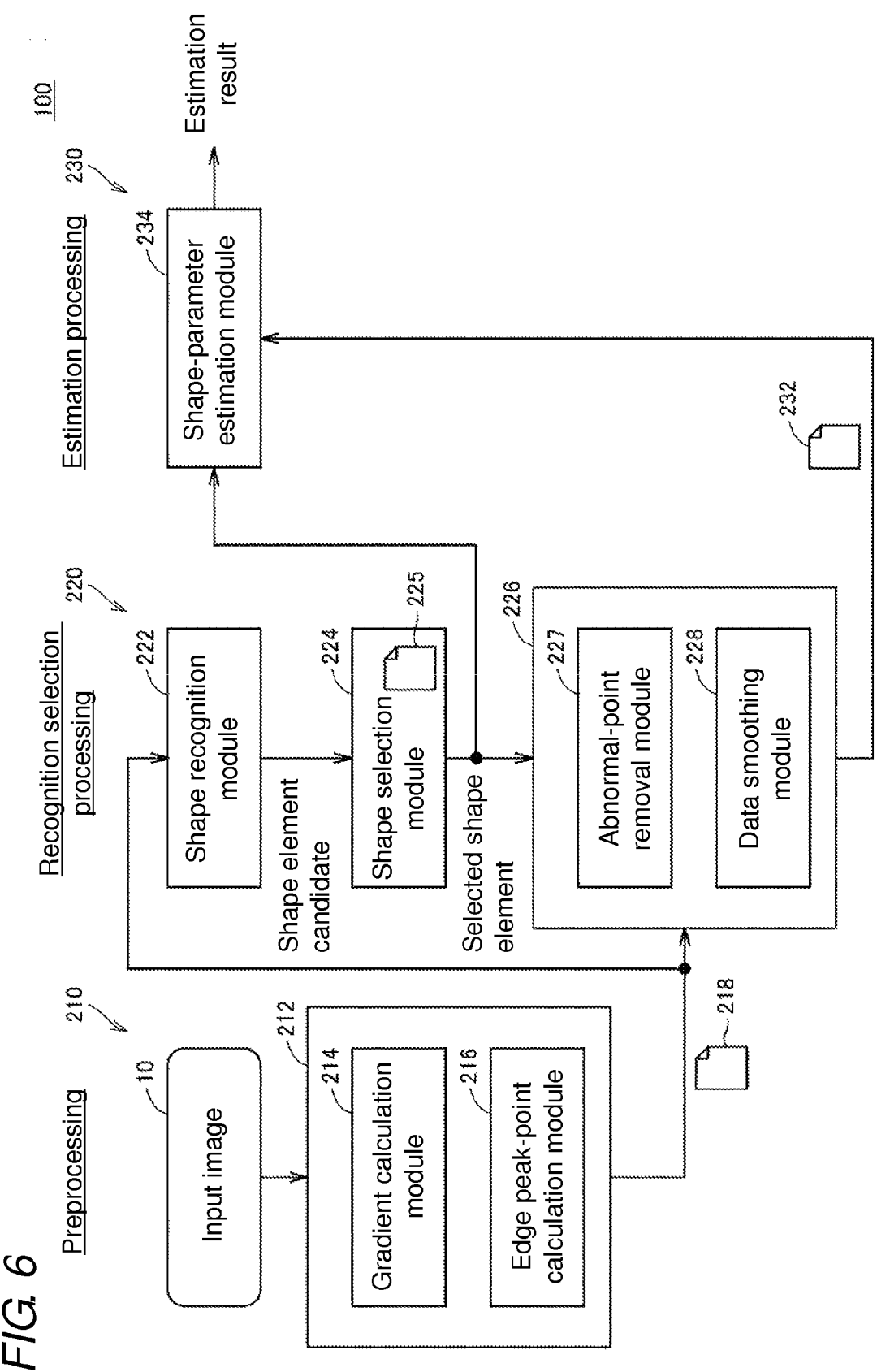
FIG. 6 is a schematic view of a basic processing procedure of the image processing device according to the embodiment.

FIG. 6 is a schematic view of a basic processing procedure of the image processing device 100 according to the embodiment. The image processing device 100 executes preprocessing 210, recognition selection processing 220 corresponding to a data-purification processing, and estimation processing 230 corresponding to a shape-fitting processing.

In the preprocessing 210, the image processing device 100 receives an input image 10 of the processing target, and extracts a feature amount necessary to estimate the shape element from the input image 10. In the recognition selection processing 220, the image processing device 100 reduces as far as possible the information that becomes noise of shape elements other than the shape element of the estimation target out of the shape elements included in the input image 10. In the estimation processing 230, the image processing device 100 estimates the target shape element by using information after the recognition selection processing 220.

The preprocessing 210 includes a feature-amount extraction module 212 that extracts the feature amount included in the input image 10. Although any kind of information may be used for the feature amount to be extracted, edge points are used in the embodiment. The feature-amount extraction module 212 includes a gradient calculation module 214 and an edge peak-point calculation module 216.

The gradient calculation module 214 calculates the gradient of pixel values, along a search direction that is arbitrarily set to the input image 10. More specifically, the gradient calculation module 214 sequentially calculates the change of pixel values of adjacent pixels. The edge peak-point calculation module 216 calculates the edge point from the gradient of the pixel value calculated by the gradient calculation module 214. More specifically, the edge peak-point calculation module 216 extracts a peak point from a profile along the search direction of the calculated gradient, and determines the edge point from the extracted peak point. An edge image 218 that includes the feature amount extracted by the preprocessing 210 becomes the processing target of the recognition selection processing 220.

The recognition selection processing 220 includes a shape recognition module 222, a shape selection module 224, and a noise removal module 226. The noise removal module 226 is arbitrary, and may not be included in the recognition selection processing 220, or may be included as a part of the estimation processing 230 at a later stage. The processing content of the noise removal module 226 may be also appropriately set according to the input image 10 of the target.

The shape recognition module 222 recognizes one or more shape elements included in the input image 10 from the feature amount included in the input image 10. Representatively, the shape recognition module 222 processes the edge image 218 generated by the preprocessing 210, and recognizes shape elements that belong to one or a plurality of categories based on a shape element deciding unit that is specialized for each shape element, so that the shape recognition module 222 recognizes shape elements that are included in the edge image 218. Details of the recognition processing of the shape elements by the shape recognition module 222 will be described later. The information of the shape elements recognized by the shape recognition module 222 are output to the shape selection module 224.

The shape selection module 224 selects a desired shape element out of recognized one or more shape elements. More specifically, the shape selection module 224 selects a desired shape element out of one or more shape elements, according to the degree of conformity to a predetermined standard, out of shape element candidates that are output from the shape recognition module 222. The predetermined standard includes at least one of length, size, area, brightness, and edge strength of the shape element. The information of the selected shape element is utilized by the noise removal module 226 and by the estimation processing 230. In selecting the shape element, the shape selection module 224 may refer to base data 225 that has been set in advance.

The noise removal module 226 removes information that becomes disturbance according to the selected shape element. The noise removal module 226 reduces a noise factor by a shape element other than the shape element selected by the shape selection module 224, following the selected shape element. More specifically, the noise removal module 226 removes and reduces the information relevant to a shape element other than the shape element of the edge image 218. As an example, the noise removal module 226 includes an abnormal-point removal module 227 and a data smoothing module 228.

The abnormal-point removal module 227 removes an abnormal point that does not correspond to the selected shape element. Representatively, the abnormal-point removal module 227 decides as an abnormal point an edge point that has been decided to be irrelevant to the shape element of the edge image 218, and removes the edge point that has been decided as the abnormal point. For this abnormal-point removal processing, the distance-based value voting method disclosed in Unexamined Japanese Patent Publication No. 2007-249555 and the like can be used.

In addition to these methods, the noise removal module 226 may employ the following methods.

(a) The noise removal module 226 executes weighting processing according to a degree of information that becomes disturbance depending on the selected shape element.

(b) The noise removal module 226 executes processing (abnormal-point removal processing) that removes an abnormal point which does not correspond to the selected shape element.

(c) The noise removal module 226 executes weighting processing (abnormal-point removal processing) according to an abnormality degree of an abnormal point which does not correspond to the selected shape element.

(d) The noise removal module 226 executes filtering processing (data smoothing processing) depending on the selected shape element.

(e) The noise removal module 226 executes weighting processing (data smoothing processing) according to a result of the filtering processing according to the selected shape element.

Further, the noise removal module 226 may perform, by the interpolation processing, processing of expanding a point or a feature amount that configures the selected shape element.

The data smoothing module 228 executes filtering according to the selected shape element. Representatively, the data smoothing module 228 removes and reduces random noise and the like that are included in the edge image 218, by applying various kinds of filter processing.

A noise-removed edge image 232 generated by noise removal by the recognition selection processing 220 is transmitted to the estimation processing 230, and information of the shape element selected by the shape selection module 224 is also transmitted to the estimation processing 230.

In the estimation processing 230, the target shape element is estimated from the information of the region corresponding to the selected shape element. Representatively, in the estimation processing 230, the shape element included in the noise-removed edge image 232 is estimated. That is, in the estimation processing 230, an approximation straight line and an approximation curve that express the shape element as the estimation target are determined, and the determined result is output as the estimation result. A shape-parameter estimation module 234 is included as a function of the estimation processing 230.

By this series of processing, shape-element estimation can be performed robustly.

<E. Shape Recognition Module>

Next, the estimation processing of a shape element by the shape recognition module 222 included in the recognition selection processing 220 shown in FIG. 6 will be described in detail.

The shape recognition module 222 recognizes shape elements that belong to one or a plurality of categories, based on a shape element deciding unit that is specialized for each shape element. The shape in this case is a circle and a straight line having different parameters when describing parametrically, and will be referred to as a shape of different categories.

As a method for estimating a shape element, the clustering method can be used. When a plurality of kinds of shape elements have been assumed as shape elements of the estimation target, it is possible to use combined detection logics of the plurality of kinds of shape elements such as a straight-line detection logic, a circle detection logic, and an ellipse detection logic.

In the image processing according to the embodiment, because basically at least a subject that becomes a reference is known in advance, a kind of a shape element of the estimation target can be assigned in advance. That is, because the content of the image processing to be executed is determined in advance, there is no case where it is necessary to estimate an unknown shape element. Therefore, it is general that a program is prepared in advance to estimate a specific kind of shape element, according to the processing to be executed. However, depending on the application to be applied, there is a case where an unknown shape element needs to be estimated. In this case, it is necessary to execute sequentially/in parallel the logics for estimating respective shape elements of a straight line, a circle, and an ellipse.

(1) Clustering Method

For the clustering method, by specifying a cluster concerning a gradient of each pixel on the image, a straight line that is included in the input image 10 can be estimated as a shape element.

Figure 7:
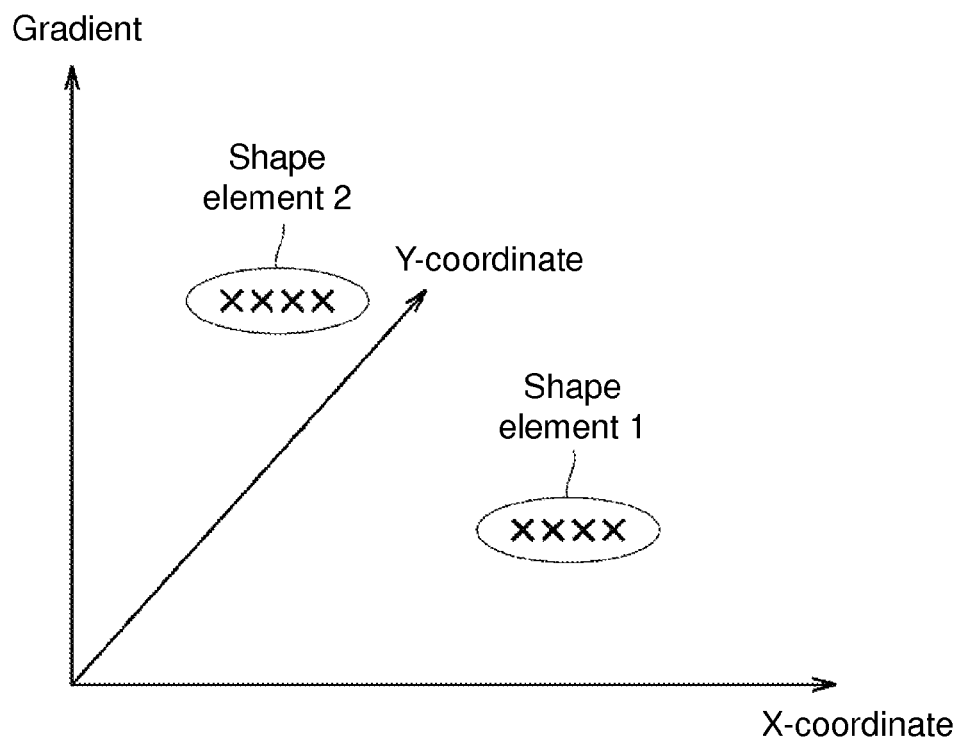
FIG. 7 is a diagram for explaining an example of a clustering method.

FIG. 7 is a diagram for explaining an example of the clustering method. FIG. 7 schematically expresses a relationship between coordinate values (the X-coordinate and the Y-coordinate) of each pixel that constitutes the input image 10 and a corresponding gradient. For example, edge points on the shape elements of the same straight line have basically the same gradients. Therefore, in the parameter space shown in FIG. 7, shape elements of straight lines that are included in the input image 10 can be estimated by specifying the group of pixels whose coordinate values are close to each other and whose sizes of gradients are similar to each other. That is, the shape recognition module 222 estimates a shape element by clustering a feature amount that is included in the input image 10.

(2) Circle Detection Logic and Ellipse Detection Logic

As the circle detection logic and the ellipse detection logic, a center point is estimated by applying the least-squares method to a plurality of edge points, a variance of a radius from the center point and the like are estimated, and a circle or an ellipse that is included in the input image 10 is estimated as a shape element.

A representative example of the estimation processing of shape elements by the shape recognition module 222 has been exemplified. Any method that can estimate the shape elements included in the input image 10 may be employed, without limiting to the exemplified processing.

For example, a method (a voting method and a distance from a standard point, for example) that utilizes a parameter space that is intrinsic to the shape element can be employed. The shape recognition module 222 utilizes a feature-amount space according to a shape element or utilizes a mapping space to a parameter space according to a shape element, for the feature amount extracted from the input image 10, and recognizes the shape element on the space. Alternatively, the shape recognition module 222 utilizes a feature-amount space according to a shape element or utilizes a mapping space to a parameter space according to a shape element, for the feature amount extracted from the input image 10, and recognizes the shape element by clustering on the space.

Further, an arbitrary shape similarity calculated by combination of area, surrounding length, length of a side, and angle may be evaluated. For example, circularity can be evaluated from area and surrounding length. Squareness can be evaluated from length of a side and vertex.

Further, the shape recognition module 222 may perform in two or more stages the processing of estimating a shape element by dividing an edge or a shape-intrinsic parameter extracted from the input image following the shape element that the user has assigned in advance, and by integrating the divided edges or parameters. In this case, the dividing processing includes the processing of dividing the edge extracted from the image into detailed segments, or the processing of dividing in the parameter space the shape-intrinsic parameter extracted from the image brightness information. The processing of dividing on the parameter space includes the processing of dividing by distance on the parameter space.

The dividing processing includes the processing of clustering the segments or the points on the parameter space and collecting the clustered result in a shape element unit.

For such a dividing and integrating unit, the following operations are assumed.

(a) The shape recognition module 222 divides and outputs all shape elements that are included in the input image 10, following the shape element that has been assigned in advance by the user.

(b) The shape recognition module 222 outputs different shape elements by the shape element or the parameter that has been assigned in advance by the user.

(c) The shape recognition module 222 executes only recognition of a shape element when there is only one shape element, and does not recognize other shape element.

(d) The shape recognition module 222 executes recognition of two or more stages, corresponding to recognition of a rough shape element and recognition of a detailed shape element.

(e) The shape recognition module 222 executes dividing of two or more stages, corresponding to dividing of a rough shape element and dividing of a detailed shape element.

(f) The shape recognition module 222 executes dividing and integrating processing of two or more stages, corresponding to dividing of a detailed shape element and integration of a detailed shape element.

(g) The shape recognition module 222 executes dividing and integrating processing of two or more stages, corresponding to dividing of a detailed shape element and integration of a detailed shape element, and excludes undesirable shape elements at the time of further detailed dividing of shape elements.

(h) The shape recognition module 222 executes dividing and integrating processing of two or more stages, corresponding to dividing of a detailed shape element and integration of a detailed shape element, and selectively integrates shape elements while excluding undesirable shape elements at the time of further integration.

(i) The shape recognition module 222 executes dividing of two or more stages, corresponding to dividing of shape elements that belong to a plurality of categories and dividing of a shape element of each category.

(j) The shape recognition module 222 outputs shape elements excluding excessive regions between a plurality of shape elements.

<F. Shape Selection Module>

Next, shape selection processing by the shape selection module 224 included in the recognition selection processing 220 shown in FIG. 6 will be described.

The shape selection module 224 selects a shape element to be used for the estimation processing out of the shape elements that have been estimated by the shape recognition module 222. As a method for selecting the shape element, a shape element that most conforms to one or a plurality of standards may be selected out of estimated plurality of shape elements. A plurality of shape elements may be selected as shape elements. In this case, a plurality of the same kind of shape elements such as two straight lines may be selected, and different kinds of shape elements such as one straight line and one circle may be selected, respectively. A selection method that mixes these two methods may be also employed.

Therefore, according to the selected kind of shape element, a plurality of standards may be set in advance. The shape selection module 224 may select a target shape element out of one or more shape elements according to the degree of conformity to a predetermined standard. For example, in the case of selecting only one specific shape element, a shape element that most conforms to the standard may be selected out of estimated plurality of shape elements. In the case of selecting a plurality of a single kind of shape elements, a necessary number of shape elements that have a high degree of conformity to the standard may be selected.

On the other hand, in the case of selecting different kinds of shape elements respectively, a first standard of a first kind of shape element and a second standard of a second kind of shape element may be prepared in advance. Shape elements that most conform to the first standard and the second standard may be selected.

For the standard to be used to select a shape element, there are used parameters of length of a shape element, size of a shape element, area of a shape element, strength, fitting error, similarity to and difference from angle, position, size, radius, center position, and color of a shape element that have been assigned in advance, for example. For selecting a shape element, because arbitrary parameters and conditions suitable for the object can be used, the parameters are not limited to the above parameters. However, as a practical standard, it is preferable to include at least one of length, size, and area of a shape element to be selected.

When it is desired to set a plurality of kinds of parameters, there may be set more priorities between parameters. Alternatively, a plurality of parameters may be combined, and a weighting factor may be given to each parameter. A selection target may be determined according to conformity that is calculated by reflecting these weighting factors.

The content of parameters for selecting the shape element is determined according to the kind of a shape element of the selection target. Processing of determining an optimum value of each parameter may be further added.

The user may set the standard for selecting a shape element, or the user may set the standard each time. Alternatively, the user may directly select the target shape element in the state that candidates of estimated shape elements are listed.

An example of a setting method of a standard for selecting a shape element will be described next.

Figure 8:
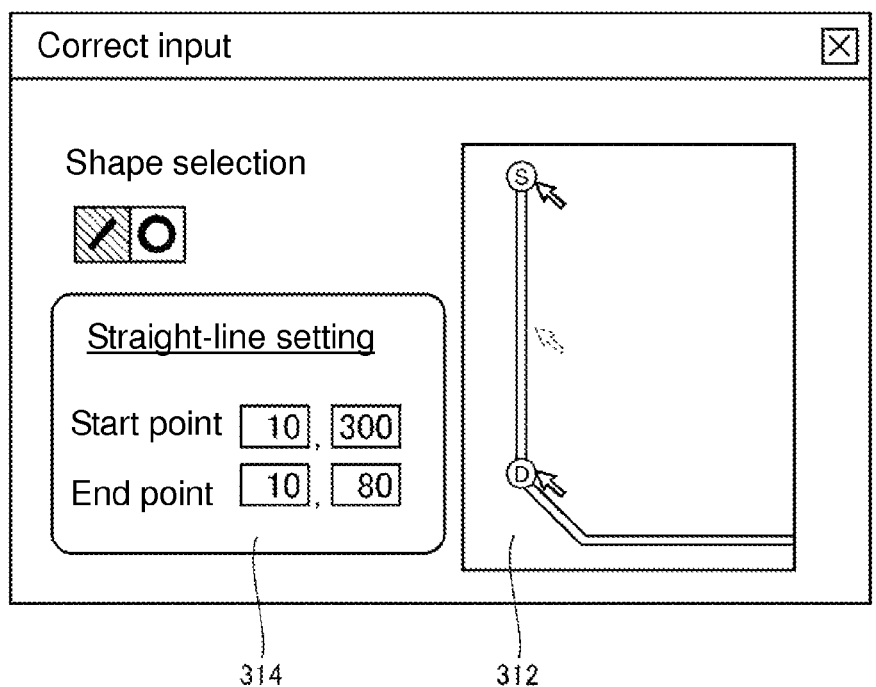
FIG. 8 shows an example of a display screen for setting a standard for selecting a shape element provided by the image processing device according to the embodiment.

FIG. 8 shows an example of a display screen for setting a standard for selecting a shape element provided by the image processing device 100 according to the embodiment. A display screen 300 shown in FIG. 8 displays the input image 10 in an image display area 312. The user assigns the shape element of the estimation target to displayed the input image 10. The input image 10 is representatively an image generated by capturing the image of a work (reference) that becomes a standard. The display screen 300 shown in FIG. 8 displays the work including three straight line elements similar to those shown in FIG. 3.

The user assigns a shape element to be selected to the displayed work. For example, as shown in FIG. 8, the user assigns a start point and an end point of a shape element by operating the mouse as shown in FIG. 8. By assigning the start point and the end point, coordinate values of the respective points are set (coordinate-value setting area 314). As a method for selecting a shape element from a plurality of shape elements estimated from the edge image 218, there may be selected a shape element that is located at positions similar to the assigned start point and end point. Alternatively, a shape element that has values similar to those of the inclination calculated from the coordinate values of the assigned start point and end point may be selected.

By using the display screen 300, a shape element can be intuitively assigned to the displayed input image, and the standard can be set more easily and quickly. Based on such a user operation, coordinates of the start point and the end point as the standard for selecting a desired shape element can be determined.

For the setting processing of the standard of the selection processing of a shape element, it is not always necessary to use the display screen as shown in FIG. 8. For example, by calculating a feature amount that expresses a shape element of the estimation target from a setting diagram or the like of a measurement object, the standard may be set by using the calculated feature amount.

<G. Repetition Processing>

As described above, one or a plurality of shape elements are selected from a plurality of shape elements that have been recognized from the edge image 218. When a plurality of shape elements have been selected, the noise removal module 226 (FIG. 6) repeatedly executes noise removal and the shape-parameter estimation module 234 (FIG. 6) repeatedly executes the estimation processing 230, by the number of selected shape elements. That is, estimation results of the shape elements are output by the number of the selected shape elements.

This is because the processing needs to be changed according to the kind of a selected shape element, and because estimation accuracy can be enhanced by avoiding giving influences between the selected shape elements. However, when the same kind of shape element has been selected as a shape element, the processing time may be shortened by sharing a part of the processing.

<H. Output of Estimation Processing and Estimation Result>

As described above, when the shape element has been selected, noise removal processing is executed to the edge image 218 based on the selected shape element, and thereafter, the estimation processing 230 is executed. Because shape elements other than the estimation target are removed by the recognition selection processing 220, the shape element can be estimated with higher estimation accuracy.

The shape-parameter estimation module 234 estimates the selected shape element, and outputs parameters that express the target shape element. Examples of parameters to be estimated are as follows.

The shape element is a circle: a radius and a center coordinate

The shape element is a square: a length of each side and a center coordinate

The shape-parameter estimation module 234 estimates the shape element by using the following methods according to the selected shape element.

The shape element is a circle: a circle Hough transformation or a search processing The shape element is a quadrangle: a four-corner detection or search processing The shape element is a straight line: a straight-line Hough transformation, a least-squares method, and a search processing The shape-parameter estimation module 234 may output a different estimation result depending on an estimation standard that the user has assigned in advance.

The estimation result of the shape element is output by various kinds of methods and modes.

Figure 9:
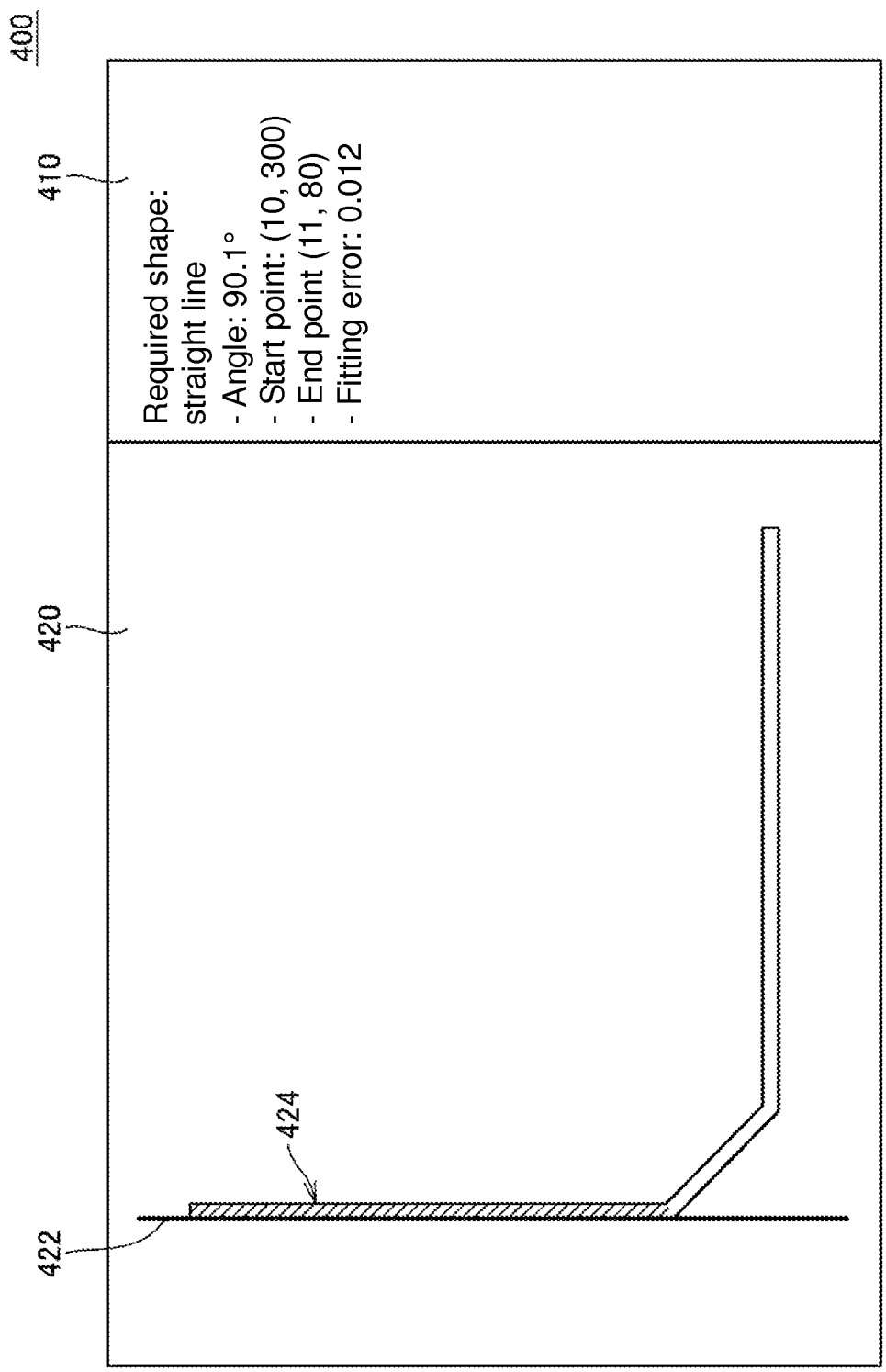
FIG. 9 shows an example of a display screen for outputting an estimation result provided by the image processing device according to the embodiment.

FIG. 9 shows an example of a display screen for outputting an estimation result provided by the image processing device 100. A display screen 400 shown in FIG. 9 includes a region (result display area 410) that expresses the result of estimating the shape element, and a region (image display area 420) that expresses the input image and the like.

In the result display area 410, various kinds of parameters of the shape element estimated by the estimation processing are displayed. As an example of the estimation result, various kinds of estimation results such as an angle, a start point, and an end point of the estimated straight line, and a fitting error are displayed. Without limiting to the estimation result shown in FIG. 9, various kinds of results and information may be notified to the user.

In the image display area 420, approximation straight line 422 estimated based on the input image is displayed together with the input image that has become the processing target. At this time, preferably, the selected shape element is visually notified to the user. In the example shown in FIG. 9, the portion of the selected shape element is displayed in the mode different from those of other regions. As a method for visually notifying the selected shape element, various kinds of display formats can be employed. For example, the selected shape element (the line segment in this example) is displayed in the color different from those of other regions. The periphery of the selected shape element is flickered. Only the periphery of the selected shape element is displayed in color, and other regions are displayed in gray scale. When a plurality of shape elements have been selected, each shape element is displayed by emphasis by using a different color.

Alternatively, edge points that have been removed as shape elements other than the selected shape element may be displayed in a display mode different from those of other regions. For example, the color of only the removed edge points may be displayed by changing colors.

In this way, the image processing device 100 has the output function for displaying the estimation result that expresses the target shape element together with the input image 10. The region corresponding to the shape element of the estimated target is displayed in a region different from other regions.

When the result display area 410 and the image display area 420 are not separately provided like the display screen 400 in FIG. 9, the estimation result may be displayed together with the input image by automatically optimizing the display position so that the measurement target region to be set is not superposed with the input image 10.

Further, as a display mode of a result of performing the image processing to the color input image, the input image itself that has been input may be displayed in a gray scale and the estimation result may be displayed by using a fresh color in the layer at the front side.

When the user has selected the vicinity of the approximation straight line calculated by the estimation processing, this display content may be automatically displayed by enlargement. By using such an enlarged display, the user can visually understand a difference between the calculated approximation curve and the edge point extracted from the input image. For the mode of this enlarged display, the measurement target region selected by the user may be automatically displayed in the full screen.

<I. Optimization Processing>

By conforming to the selection of the shape element in the recognition selection processing 220, the succeeding processing may be optimized. For example, by using the information of a position and a size of the selected shape element, behaviors of abnormal-point removal by the abnormal-point removal module 227 (FIG. 6) and/or smoothing (filter processing) by the data smoothing module 228 (FIG. 6) may be dynamically changed. Specifically, according to the selected shape element, parameters that show what range of deviation should be removed as the abnormal point may be changed, or the roughness of smoothing may be changed.

Further, a region that becomes the target of the estimation processing (detection processing of a line segment, for example) by the estimation processing 230 and a threshold value may be automatically changed.

Without limiting to the above changes, according to the selected shape element, behaviors of subsequent abnormal-point removal, smoothing, and estimation processing may be controlled in detail.

In this way, by dynamically/statically optimizing the subsequent processing according to the selected shape element, accuracy of the estimation processing of the shape element can be enhanced.

<J. Processing Procedure>

Figure 10:
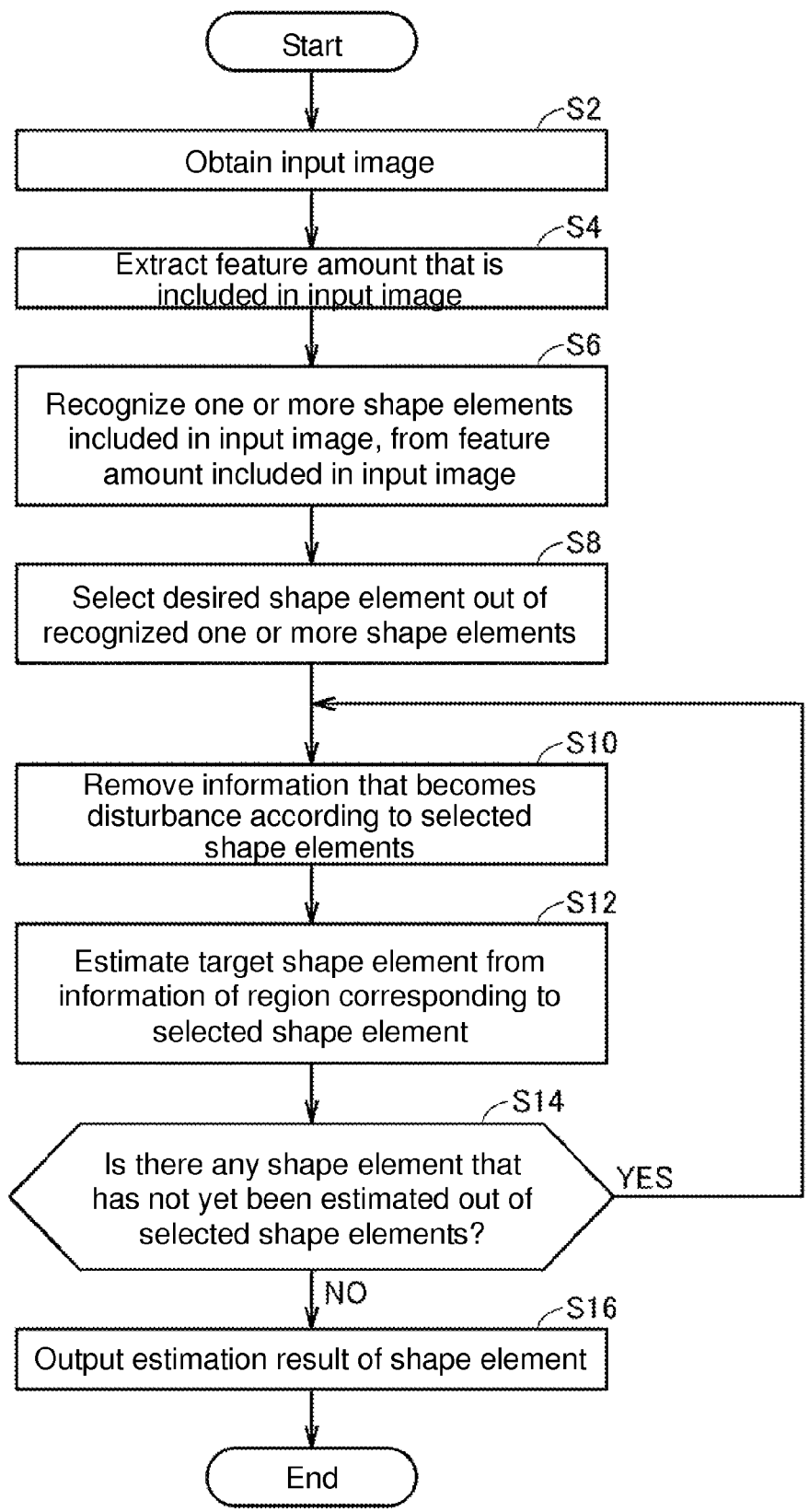
FIG. 10 is a flowchart for explaining the processing procedure in the image processing device according to the embodiment.

Next, a processing procedure of the image processing device 100 according to the embodiment will be described. FIG. 10 is a flowchart for explaining the processing procedure in the image processing device 100 according to the embodiment. The processing procedure shown in FIG. 10 is representatively realized by execution of a control program 150 by the image processing device 100. That is, the control program 150 includes the image processing program for estimating the shape element that is included in the input image. The image processing device 100 executes the control program 150, and accordingly executes the image processing method for estimating the shape element that is included in the input image.

In FIG. 10, the image processing device 100 obtains the input image 10 (Step S2). As described above, as the method for obtaining the input image 10, in addition to the method for obtaining data generated by capturing the image of a subject by the image capturing unit 8 which is connected to the image processing device 100, there may be employed a method for obtaining via a certain medium the input image generated by capturing the image of a subject by using an external image capturing device.

Next, the image processing device 100 extracts a feature amount that is included in the input image 10 (Step S4). Specifically, the image processing device 100 generates the edge image 218 that expresses the edge point included in the input image 10, by calculating a gradient and an edge peak point of the input image 10. Step S2 and Step S4 correspond to the preprocessing 210 shown in FIG. 6.

Next, the image processing device 100 recognizes one or more shape elements that are included in the input image 10 from the feature amount included in the input image 10 (Step S6). The image processing device 100 applies the clustering method and various kinds of detection logics to the edge image 218. Next, the image processing device 100 selects a desired shape element out of the recognized one or more shape elements (Step S8). Specifically, the image processing device 100 selects a shape element to be used for the estimation processing 230, by referring to the base data 225 that has been set in advance or by any method.

Then, the image processing device 100 removes the information that becomes disturbance according to the selected shape element (Step S10). Specifically, the image processing device 100 reduces noise factors due to shape elements other than the selected shape element following the shape element. For the processing to reduce the noise factors, abnormal points are removed and data is smoothed.

Next, the image processing device 100 executes the estimation processing 230 (FIG. 6). That is, the image processing device 100 estimates a target shape element from the information of the region corresponding to the selected shape element (Step S12).

By the above series of processing, the processing of estimating the shape elements included in the input image is completed. When a plurality of shape elements have been selected, it is necessary to estimate the shape elements by the number of the shape elements. Therefore, the image processing device 100 decides whether there remains a shape element that has not yet been estimated out of the selected shape elements (Step S14). When there remains a shape element that has not yet been estimated (YES in Step S14), the image processing device 100 repeatedly executes the processing in Steps S10 and S12 for the remaining shape element.

When estimation of all the shape elements has been completed (NO in Step S14), the image processing device 100 outputs the result of estimating the shape elements obtained in Step S12 (Step S16). Then, the processing ends.

According to the image processing device of the embodiment, even when a plurality of shape elements are mixed in the input image (or the measurement target region that is set in the input image), the shape element can be estimated by narrowing to the shape element of the target. Therefore, estimation accuracy can be enhanced, and strong robustness against disturbance can be enhanced.

The method disclosed in Unexamined Japanese Patent Publication No. 2009-186338 is for performing a second fitting by using all points that are present in the region having a constant width, from a first fitting process. Therefore, the result of the processing is little different from that in the first fitting, and the first fitting is almost ruling. In order to clean the data, it is necessary to set a very narrow width. However, when a very narrow width is set, most of the points are removed, and a result that lacks stability is output. According to the embodiment, by sandwiching the data purification process, unnecessary data and necessary data can be correctly selected.

It should be considered that the embodiment disclosed this time is an exemplification in all aspects and is not limiting. The range of the present invention is expressed in claims and not in the above description, and is intended to include all alterations in the meaning and the range equivalent to the claims.

The invention claimed is:

1. An image processing device comprising:
   a processor; and
   a memory including instructions that, when executed by the processor, cause the processor to perform operations including:
   recognizing one or more shape elements which are included in an input image from a feature amount included in the input image;
   selecting a desired shape element out of the one or more shape elements that are recognized;
   removing information which becomes disturbance according to a selected shape element; and
   estimating a target shape element from information of a region corresponding to the selected shape element,
   wherein the removing includes performing, by interpolation processing, processing of expanding a point or a feature amount that configures the selected shape element.

2. The image processing device according to claim 1, wherein
   the recognizing includes recognizing shape elements that belong to one or a plurality of categories, based on a determination that is specialized for each shape element.

3. The image processing device according to claim 1, wherein
the recognizing includes performing in two or more stages processing of estimating a shape element, by dividing an edge or a shape-intrinsic parameter extracted from the input image following a shape element that a user assigns in advance, and by integrating divided edges or parameters.

4. The image processing device according to claim 1, wherein
the recognizing includes utilizing a feature-amount space according to a shape element or utilize a mapping space to a parameter space according to a shape element, for a feature amount extracted from the input image, and is configured to recognize a shape element on the space.

5. The image processing device according to claim 1, wherein
the recognizing includes utilizing a feature-amount space according to a shape element or utilize a mapping space to a parameter space according to a shape element, for a feature amount extracted from the input image, and is configured to recognize a shape element by clustering on the space.

6. The image processing device according to claim 1, wherein
the selecting includes selecting a desired shape element out of the one or more shape elements, according to a degree of conformity to a predetermined standard.

7. The image processing device according to claim 6, wherein
the predetermined standard comprises at least one of length, size, area, brightness, and edge strength of a shape element.

8. The image processing device according to claim 1, wherein
the estimating includes setting a parameter to be estimated according to a selected shape element of the input image.

9. The image processing device according to claim 1, the operations further including displaying an estimation result which expresses a target shape element together with the input image, wherein
the displaying includes displaying a region corresponding to a shape element of the estimated target in a region different from other regions.

10. The image processing device according to claim 1, the operations further including:
generating the input image by capturing an image of a subject; and
outputting an instruction to a driving device that changes a position of the subject, based on an estimated parameter which indicates a target shape element.

11. An image processing method comprising:
recognizing one or more shape elements which are included in an input image from a feature amount included in the input image;
selecting a desired shape element out of the one or more shape elements that are recognized;
removing information which becomes disturbance according to a selected shape element; and
estimating a target shape element from information of a region corresponding to the selected shape element,
wherein the removing includes performing, by interpolation processing, processing of expanding a point or a feature amount that configures the selected shape element.

12. A non-transitory computer readable storage medium encoded with an executable computer program for image processing and that, when executed by a processor, causes the processor to perform operations comprising:
recognizing one or more shape elements which are included in an input image from a feature amount included in the input image;
selecting a desired shape element out of the one or more shape elements that are recognized;
removing information which becomes disturbance according to a selected shape element; and
estimating a target shape element from information of a region corresponding to the selected shape element,
wherein the removing includes performing, by interpolation processing, processing of expanding a point or a feature amount that configures the selected shape element.

* * * * *